Feb. 21, 1961 J. J. SUOZZI 2,972,714

BIASED-RECTIFIER CONTROL OF MAGNETIC AMPLIFIERS

Filed July 12, 1957

INVENTOR.
JOSEPH J. SUOZZI

BY

ATTYS 2,972,714
Patented Feb. 21, 1961

2,972,714

BIASED-RECTIFIER CONTROL OF MAGNETIC AMPLIFIERS

Joseph J. Suozzi, Pittsburgh, Pa., assignor to the United States of America as represented by the Secretary of the Navy Filed July 12, 1957, Ser. No. 671,673
12 Claims. (Cl. 323—89)
(Granted under Title 35, U.S. Code (1952), sec. 266)

The invention described herein may be manufactured and used by or for the Government of the United States of America for governmental purposes without the payment of any royalties thereon or therefor.

The present invention relates to improvements in the control circuit of half-wave bridge-type magnetic amplifiers and more particularly to the provision of synchronously switched biased-diodes in the control circuit of a half-wave bridge-type magnetic amplifier stage to insert an impedance in the control circuit only during the power half-cycles of the stage, resulting in an increased gain by a factor of three to four over conventional half-wave bridge-type magnetic amplifier stages. More specifically, the invention is directed to the concept of establishing both control and reference flux levels in a half-wave bridge-type magnetic amplifier stage through an interacting reset circuit and control circuit arrangement in which the rectifiers of the reset, or bias, circuit are included in the conductive path of the control circuit, the rectifiers being effective to present a high back impedance to the control source during the power, or firing, half-cycles of the amplifier stage and to present a negligible impedance to the control source during the reset half-cyles of the amplifier stage thereby to avoid dissipation of control current in the control circuit and consequently enhance the output of the amplifier stage over conventional amplifier stages of similar type.

Due to their high speed of response and phase reversible output characteristic, half-wave magnetic amplifiers have found extensive applications in servo systems for the solution of various instrumentation and control problems. However, the prior art half-wave magnetic amplifiers have been characterized by conventional input control circuit designs which adversely affect the gain of the amplifier. As is well known to those skilled in the art, it is generally desirable that the input control circuit of the magnetic amplifier present a high impedance to the control signal source during the power, or firing, half-cycles to avoid loading the amplifier and signal source, the absence of such high impedance during the firing half-cycles resulting in the introduction of undesirable circulating currents in the control circuit which undesirable currents cause the aforesaid loading effects.

One approach resorted to in the past to overcome these undesirable circulating currents in the control circuit of magnetic amplifiers has been to employ a combined positive and negative feedback arrangement. Although this feedback arrangement is satisfactory for D.C. control signals, it is unsatisfactory for transient control signals since half-wave magnetic amplifiers utilizing the feedback arrangement will not operate without some type of phase-sensitive detector to convert the transient control signal to a D.C. control signal. The present invention provides a novel control circuit arrangement which overcomes undesirable circulating control-circuit currents without the necessity of employing a phase-sensitive detector, the circuit arrangement of the present invention being inherently phase-sensitive and equally responsive to either A.C. or phase-reversible D.C. control signals.

Another conventional practice employed in the magnetic amplifier art to prevent the aforedescribed deleterious loading effects has been to insert a resistor, of the order of 10,000 ohms, in series with the control windings of the amplifier stage. Although this resistor provides the desired high impedance during the power half-cycles, it is also present in the control circuit during the control, or reset, half-cycles and causes dissipation therein of a major portion of the control signal. As a result of this loss of control signal energy in the series control resistor, it has been necessary heretofore to employ several amplifier stages in cascade in order to obtain an output signal of sufficient magnitude to drive servo instruments. The control circuit of the present invention provides the desired control circuit impedance without the us of a series control resistor and its attendant loss of control signal energy. Consequently, the arrangement of the present invention makes feasible the attainment of higher gain with a less number of stages.

From the foregoing, it is obvious that the ideal conditions for optimum control circuit operation in a half-wave magnetic amplifier is to provide a control circuit which presents a high impedance to the control source during the power half-cycles and neglible impedance to the control source during the control, or reset, half-cycles. The general purpose of this invention is to provide a control circuit arrangement which fulfills the aforedescribed ideal conditions and which does not utilize a series control resistor or a phase-sensitive detector.

In accordance with the present invention to attain the ideal conditions, the control windings of a half-wave bridge type magnetic amplifier are connected in series circuit relation with the pair of rectifiers of the amplifier bias circuit which is energized from the A.C. operating source, the pair of rectifiers being similarly poled with respect to the A.C. source and connected in polarity opposition in the series circuit relation. On the power half-cycles when the load windings of the amplifier are passing current from the A.C. operating source, the pair of bias circuit rectifiers are non-conductive; and, as a result of the polarity opposition arrangement thereof in the seriese circuit relation with the control windings, at least one of the bias circuit rectifiers is phased to prevent conduction of the control signal and to present a high back impedance to the control source, the rectifier presenting the back impedance being dependent on the polarity of a D.C. phase-reversible input control signal or the phasing of an A.C. input control signal applied to the control circuit of the amplifier. However, on the reset half-cycles, the bias circuit rectifiers are rendered conductive by the A.C. operating source and become negligible impedance devices, thereby presenting a conductive path to the control signal and enabling the control signal to flow through the bias circuit rectifiers and be fully impressed on the control windings. It is to be noted that the unsaturated impedance condition of the cores during the reset half-cycles is sufficient to prevent loading down of the control source and the amplifier on the reset half-cycles, as is well known by those skilled in the art.

Therefore, since the control source sees at least the back impedance of one rectifier during the power half-cycles and no external impedance during the reset half-cycles, the ideal conditions for high external impedance on the firing half-cycles and negligible impedance on the reset half-cycles are met by the novel interacting control and bias circuit arrangement of the present invention. Moreover, since the bias half-wave currents, occurring during alternate half-cycles of the A.C. operating source, provide the potential level which renders the bias circuit rectifier conductive, the control signal current cannot exceed the magnitude of the bias half-wave currents, the portion of the control signal current which exceeds the bias current magnitude being limited to the amplitude level established in the rectifiers by the magnitude of the bias current. Thus, the control circuit arrangement of the present invention is characterized by the additional advantage of providing an automatic control-current limiter.

Furthermore, the present invention is to be distinguished from, and not considered analogous to, prior art magnetic amplifier arrangements which incorporate rectifiers in the control winding circuit. Although rectifiers have been used heretofore in the control circuit of magnetic amplifiers, the rectifiers of the prior art arrangements were used primarily to rectify the currents flowing in the control circuits thereof. As a result of the presence of these rectifiers in the control circuits thereof, these prior art arrangements were incapable of attaining phase reversibility and hence were incapable of utilization with phase-reversible D.C. control signals or with A.C. control signals. In contrast, the control circuit arrangements of the present invention include the bias-circuit rectifiers in circuit relation therewith and yet retain the phase reversible characteristic so highly desired in half-wave magnetic amplifier designs.

With the foregoing in mind, it is an object of the present invention to provide improved means to control a half-wave bridge-type magnetic amplifier stage so as to obtain, without sacrifice of input impedance, a higher gain than heretofore attained by similar type magnetic amplifier stages.

Another object is the provision, in a magnetic amplifier, of a novel control circuit which presents a high input impedance during the power half-cycles of the amplifier and negligible input impedance during the reset half-cycles of the amplifier.

Still another object is to provide, in a magnetic amplifier, an input control circuit which presents a high input impedance during the power half-cycles of the amplifier with no adverse effects on the amplification factor thereof.

A further object of the invention is the provision of a magnetic amplifier control circuit which displays a high input impedance during the power half-cycles of the amplifier with no loss of control current during the reset half-cycles of the amplifier.

A still further object of the present invention is the provision, in a magnetic amplifier, of a control circuit which automatically functions as a current limiter.

Another further object is to provide a magnetic amplifier control circuit which avoids the utilization of either a series control resistor or a phase-sensitive detector.

An important object of the invention is the provision of synchronously switched biased-diodes in the control circuit of a half-wave bridge-type magnetic amplifier to provide high input impedance during the firing half-cycles and negligible impedance during the reset half-cycles.

Another important object is to provide a magnetic amplifier control circuit which includes rectifiers therein and which is phase-sensitive and equally responsive to either A.C. or phase reversible D.C. control signals.

An essential object of the present invention is the provision, in a magnetic amplifier stage, of rectifiers in the control circuit to isolate the control signal source from the amplifier stage until the rectifiers are biased to conduction during the reference-flux establishing operation of the amplifier stage.

A significant object is to provide, for a half-wave magnetic amplifier, a phase reversible control circuit which presents a high impedance to the control source during the power half-cycles and negligible impedance during the control half-cycles.

A primary object of the present invention is the concept, in a half-wave bridge type magnetic amplifier, of including the reference circuit rectifiers in the control circuit to provide a high input impedance during the power half-cycles and negligible impedance during the reset half-cycles.

Another primary object is to establish both control and reference flux levels in a half-wave bridge-type magnetic amplifier stage through an interacting reset and control circuit arrangement in which the rectifiers of the reset circuit are serially connected in polarity opposition in the conductive path of the control circuit.

Other objects and many of the attendant advantages of this invention will be readily appreciated as the same becomes better understood by reference to the following detailed description when considered in connection with the accompaning drawings in which like reference characters designate like parts throughout the several figures thereof and wherein.

Figure 3:
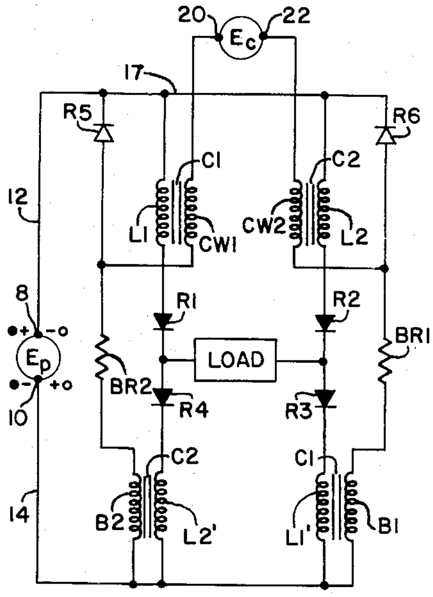
Fig. 3 is a modification of Fig. 1 and employs separate bias windings in lieu of portions of the load windings for establishing the reference flux level.
Figure 4:
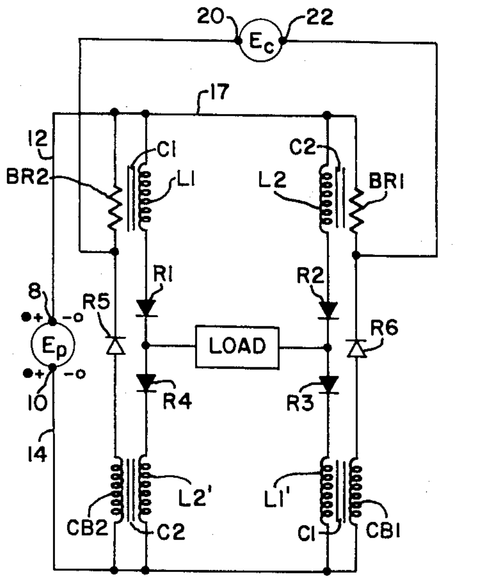
Fig. 4 illustrates another form of the interacting bias and control circuit arrangement of the invention with common windings serving to establish both bias and control flux levels.

As is well known to those skilled in the art of half-wave bridge magnetic amplifiers, the flux level is established during each of the alternate half-cycles of one polarity of the A.C. supply source, which half-cycles will hereinafter be referred to as either the reset or control half-cycles, as the case may be; and, the bridge is conductive during the other alternate half-cycles of the supply source, which half-cycles will hereinafter be referred to as either the power or firing half-cycles. In order to facilitate the operational description of the circuits herein disclosed, the graphical symbols in Figs. 1, 3 and 4 are presented in such a manner as to indicate that the black rectifiers of the bridge are similarly phased with respect to the A.C. power supply source $E_p$ so as to conduct during the half-cycles that terminal 8 of source $E_p$ is positive [black polarities] to provide half-wave power currents, while the white rectifiers of the bias circuit are similarly phased with respect to source $E_p$ so as to simultaneously conduct during the other alternate half-cycles [white polarities] of source $E_p$ to supply half-wave reset currents, source $E_p$ being either 60 c.p.s. or 400 c.p.s.

Figure 1:
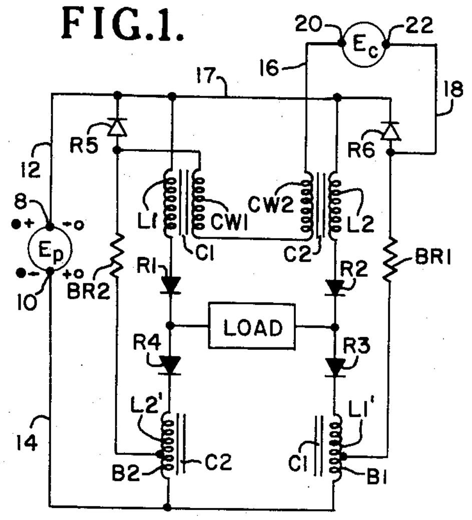
Fig. 1 is a schematic diagram of a half-wave bridge-type magnetic amplifier stage utilizing one form of the interacting bias and control circuit arrangement of the present invention with portions of the load windings serving as the bias windings.

Referring now to the drawings wherein like reference characters designate like or corresponding components in the several figures, there is shown in Fig. 1 [which illustrates a preferred embodiment of the invention] a half-wave bridge magnetic amplifier including a pair of saturable reactor cores C1 and C2 having load windings L1, L1' and L2, L2' respectively wound thereon and connected in a bridge configuration through similarly poled unidirectional conductive devices R1, R2, R3 and R4 which are preferably of the silicon diode type or of the germanium rectifier type. As is conventional, each of cores 1 and 2 is preferably formed as to provide a closed magnetic loop and preferably of the rectangular hysteresis loop type, or may be either Orthonol cores or Supermalloy cores. Although it is generally desirable for balanced operation to wind the load windings of opposing legs of the bridge on the same core, each of the load windings may be wound on separate cores if it is so desired. Alternatively, resistors may be utilized in one set of opposing legs of the bridge instead of load windings, although such an arrangement is not as effective as a bridge having reactor windings as the four impedance elements thereof. A load is connected across the output of the bridge at terminals intermediate the rectifiers and is driven by the output of the bridge in a manner correlative with the magnitude and phase sense of a control signal applied to the magnetic amplifier stage.

The A.C. power supply source E*p*, which is connected across the bridge circuit through conductors 12 and 14 so as to energize cores C1 and C2 during the power half-cycles [black polarities], is also utilized to supply the reference or reset current during the control half-cycles by passing half-wave currents simultaneously through the two branches of the reset circuit. One branch of the reset circuit is formed by bias winding B2, which is a portion of load winding L2′, connected in series with biasing resistor BR2 and rectifier R5; and, the other branch is defined by bias winding B1, which is a portion of load winding L1′, in series with biasing resistor BR1 and rectifier R6, the windings B1 and B2 being equally rated.

Rectifiers R5 and R6 are preferably of the silicon diode or germanium type and are substantially impedance-matched, as are rectifiers R1, R2, R3 and R4 of the bridge, to obtain a balanced operating condition. Resistors BR1 and BR2 are selected to be substantially equal and to each have a resistance value within the range of 20 to 100 kilohms. If the reactor cores are composed of Orthonol material, each of resistors BR1 and BR2 should preferably have a resistance of about 20 kilohms; whereas, if Supermalloy cores are used, these resistors should each preferably have a resistance of about 80 kilohms. However, it is to be understood that the values of resistors BR1 and BR2 may be varied within the 20 to 100 kilohms range at the discretion of the designer, depending upon the magnetic core material used and upon the selected turns ratio of the windings, such determinative factors being well known to those skilled in the art. It is desirable to use as high a value for resistors BR1 and BR2 as the amplifier circuit design will permit so as to utilize these resistors as an adjunct to aid the rectifiers R5 and R6 in isolating the control source E*c* from the amplifier during the power half-cycles, although the expediency of using resistors BR1 and BR2 as isolating aids is not necessary to the success of rectifiers R5 and R6 in accomplishing this isolating function.

Control windings CW1 and CW2 are connected in series with control source E*c* and are wound on their respective cores so as to differentially vary the flux levels of cores C1 and C2 in response to either a D.C. or amplitude modulated A.C. signal from control source E*c*. The series circuit, formed by control windings CW1 and CW2 with source E*c*, is connected across the two branches of the reset circuit at the cathode terminals of rectifiers R5 and R6 to form with rectifiers R5 and R6 a closed series circuit in which rectifiers R5 and R6 are connected in polarity opposition, as is more clearly illustrated in Fig. 2.

As is conventional in the operation of half-wave circuitry, the reference flux level is established in cores C1 and C2 of Fig. 1 during the reset half-cycles [white polarities] of source E*p* by half-wave currents flowing from terminal 10 of source E*p* through the bias circuit branches B2—BR2—R5 and B1—BR1—R6. During the power half-cycles [black polarities], terminal 8 is positive and the source E*p* energizes the bridge load windings with half-wave currents to saturate and fire the reactors in accordance with the flux levels preset therein during the reset half-cycles.

In the absence of a control signal, the bridge is in a balanced condition and the reactors in the bridge saturate and fire at the same time as determined by the reference flux level established during the reset half-cycles, thereby resulting in the flow of quiescent currents down the sides of the bridge with no output current through the load. However, upon application of control signal from source E*c* to control windings CW1 and CW2 during the reset half-cycles which render rectifiers R5 and R6 conductive to pass control signal currents therethrough, the control currents flowing through the differentially wound control windings CW1 and CW2 serve to unbalance the bridge by differentially varying the flux levels in cores C1 and C2 in a manner corresponding to the phase sense and amplitude of the control signal. Therefore, during the power half-cycles, cores C1 and C2 saturate at different times, depending upon their respective preset flux levels, to produce across the load an output which is correlative in polarity and magnitude to the phase sense and amplitude of the control signal.

The above-described operation of Fig. 1, with the exception of rectifier coactions in the control circuit, is the same as that of conventional half-wave bridge magnetic amplifiers. Now, in considering the operational effects of bias rectifiers R5 and R6 on the control circuit, reference is made to Fig. 2 in conjunction with Fig. 1.

Figure 2:
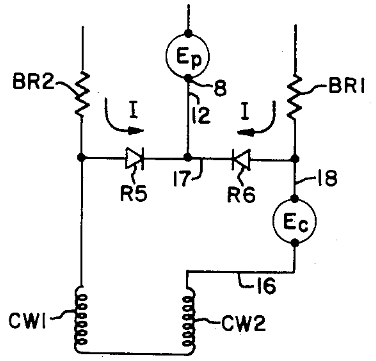
Fig. 2 is a partial schematic diagram of Fig. 1 and illustrates the interaction between the control circuit and the bias circuit.

On the reset half-cycles of source E*p* [white polarities], only rectifiers R5 and R6 are phased to conduct, while rectifiers R1 to R4 are oppositely phased and consequently are non-conductive. For optimum operation of the control circuit, one of the required ideal conditions is that, during the reset half-cycles, the control source E*c* sees no impedance due to rectifiers R5 and R6. Referring to Fig. 2 to illustrate the manner in which this condition is satisfied, the half-wave reset current I, flowing through the reset branches from source E*p* during the reset half-cycles, biases rectifiers R5 and R6 to a conductive condition; and, since rectifiers R5 and R6 become negligible impedance devices upon conduction thereof, they present no effective impedance to the control source E*c* and simultaneously serve to provide a closed series conductive path to the control signal so that all of the control signal appears on control windings CW1 and CW2, the closed series conductive path for the control signal being formed by source E*c*, conductor 16, control windings CW2 and CW1, rectifiers R5 and R6, and conductor 18.

It is to be noted that, since rectifiers R5 and R6 are conductively bilateral while in the negligible-impedance conductive-condition, the control circuit is operatively phase-sensitive and equally responsive to either phase reversible D.C. or A.C. control signals. It is further to be noted that, since the amplitude of reset current I determines the conductive bias-level in rectifiers R5 and R6, no more current than the magnitude of I can be drawn from the control source thereby providing automatic current limiting action in the control circuit.

The other ideal condition for optimum control circuit operation is that, during the power half-cycles, the control source sees a high impedance. In attaining this condition, the invention avails itself of the back impedance presented to the control source by at least one of the rectifiers R5, R6 during the power half-cycles, the rectifiers R5 and R6 being non-conductive during these half-cycles due to their phasing with respect to the A.C. source E*p*. Since rectifiers R5 and R6 are non-conductive during the power half-cycles and due to being connected in polarity opposition in series circuit relation in the control circuit, the control source E*c* sees at least the back impedance of either rectifier R5 or rectifier R6, depending upon the phase sense of the control signal from control source E*c*. For example, with reference to Fig. 2 and assuming the amplifier is in the power half-cycle condition, if the control signal is positive at terminal 22 [Fig. 1] of source E*c*, it can be seen, by tracing the possible conductive path from terminal 22 through conductor 18 and rectifier R6, that rectifier R5 presents back impedance to the control source and prevents conduction of circulating currents in the control circuit; if the phase sense of the control signal is reversed, a similar tracing of the control circuit indicates that rectifier R6 provides the back impedance.

From the foregoing analysis, it is evident that the present invention provides a novel phase-reversible control circuit arrangement which presents a high impedance to the control source during the power half-cycles and negligible impedance to the control source during the reset half-cycles.

Instead of using portions of the load winding to serve as bias windings, separate bias windings may be wound on cores C1 and C2. Fig. 3, which shows such an arrangement, is similar to Fig. 1, like components having corresponding reference characters, and includes the utilization of separate bias windings B1 and B2 connected in series with bias resistors BR1 and BR2, respectively. Otherwise, the circuit of Fig. 2 is identical to that of Fig. 1 and operates in the same manner.

Fig. 4 illustrates another form that the interacting bias and control circuit may take. In lieu of separate bias and control windings, the circuit of Fig. 4 employs a winding CB1 on core C1 and a winding CB2 on core C2 to serve as common bias and control windings. The operation of the load winding bridge arrangement during the power half-cycles is the same as described for Fig. 1. On the reset half-cycles of Fig. 4, half-wave currents from source E*p* flow through conductor 14 and divide into two branches, through winding CB2 in series with rectifier R5 and resistor BR2 in one branch and through winding CB1 in series with rectifier R6 and resistor BR1 in the other branch, to establish the reference flux level in cores C1 and C2. The action of rectifiers R5 and R6 on the control circuit during the reset half-cycles is the same as that described in connection with Fig. 2, the conductive path of the control signal in Fig. 4 being traceable from terminal 22 [assuming a control signal having a positive polarity at terminal 22] through rectifier R6, windings CB1 and CB2, rectifier R5 and back to terminal 20. It is to be noted that rectifiers R5 and R6 are again serially connected in polarity opposition in the control circuit; and, therefore at least one of these rectifiers presents a back impedance to the control source, as illustrated in Fig. 2.

Briefly stated in summary, the invention contemplates the provision in half-wave bridge magnetic amplifiers of novel phase-reversible control circuit arrangements which avoid the use of series control resistors or phase-sensitive detectors and which provide a high input impedance during the firing half-cycles and a negligible input impedance during the reset half-cycles.

Obviously many modifications and variations of the present invention are possible in the light of the above teachings. It is therefore to be understood that, within the scope of the teachings herein and the appended claims, the invention may be practiced otherwise than as specifically described.

What is claimed as new and desired to be secured by Letters Patent of the United States is:

1. In a half-wave bridge-type magnetic amplifier having reactor means with load windings and control windings thereon, said load windings being energized from an A.C. source and operable to produce an output correlative with the sense and magnitude of a control signal applied to the control windings thereon from a control source: a phase reversible circuit arrangement for presenting a high impedance to the control source during the firing half-cycles of the amplifier and negligible impedance to the control source during the reset half-cycles of the amplifier comprising the combination of reset circuit means including flux establishing windings on said reactor means in conductive circuit connection with a pair of rectifiers which are connected to be conductive on the same half-cycle of said A.C. source so as to pass half-wave current from the A.C. source through the reset circuit means for establishing reference flux level in the amplifier during conduction of said rectifiers; and a control signal receiving circuit connected to receive the control signal from said control source and including in series circuit relation the control windings of the amplifier and said pair of rectifiers, said rectifiers being connected in polarity opposition in said series circuit relation.

2. The arrangement of claim 1, wherein said flux establishing windings comprise a portion of the load windings in series with said rectifiers, said rectifiers being similarly poled with respect to said portion of the load windings, and further including a pair of biasing resistors each serially interposed between a respective one of said rectifiers and said portion of the load windings, and means connecting said control signal receiving circuit to said reset circuit means at the junctures of said rectifiers with said resistors.

3. The arrangement of claim 1, wherein said flux establishing windings are connected to present a conductive path common to said control signal and to the half-wave current occurring during conduction of said rectifiers.

4. The arrangement of claim 1, wherein said flux establishing windings are separate from the load windings and so connected in series relationship with said rectifiers as to pass current only during conduction of said rectifiers.

5. The arrangement of claim 4, wherein said flux establishing windings are connected to serve as the common windings for establishing both the reference flux level and the incremental control flux level in the magnetic amplifier, and further including a pair of resistors each connected in series with a respective one of said rectifiers, and means connecting said control signal receiving circuit to said reset circuit means at the junctures of said rectifiers with said resistors.

6. The arrangement of claim 4, wherein said flux establishing windings comprise a pair of bias windings wound on the reactor means and each connected in series with a respective one of said rectifiers to form a pair of series branch circuits, and further including circuit connections for connecting said pair of branch circuits in parallel across the A.C. source, said rectifiers being so connected in their respective branch circuits as to be poled in the same direction with respect to the A.C. source whereby said branch circuits conduct during the same half-cycle of the A.C. source, a pair of biasing resistors each connected in a respective one of said branch circuits with one terminal of each resistor being directly connected to one terminal of the rectifier in its respective branch circuit to form a junction in each of said branch circuits, and means serially connecting the control windings of said control signal receiving circuit between said junctions.

7. The arrangement of claim 6, wherein said rectifiers are of the high back-impedance type and wherein said resistors each have a resistance of the order of 20 to 100 kilohms.

8. In a half-wave bridge-type magnetic amplifier having reactor means with control winding means thereon and load winding means thereon energized from an A.C. source, the combination comprising input terminals connectable to a control signal source, an input circuit energized from said A.C. source and connected to said input terminals for receiving the control signal from said control signal source to thereby establish respectively therefrom the reference and control flux levels in said reactor means, said input circuit including a first section formed by said control winding means in series circuit relation with a pair of unidirectional conductive means and bias winding means in series with said pair of unidirectional means, said unidirectional conductive means being in polarity opposition in said series circuit relation and similarly poled with respect to said bias winding means.

9. A magnetic amplifier arrangement comprising, in combination, a single stage half-wave magnetic amplifier including four impedance elements connected in a closed circuit to form a bridge circuit, at least two of said impedance elements comprising load windings each wound on a core of saturable magnetic material, circuit means connecting said load windings to form separate parallel branch circuits in said bridge circuit, terminal means for connection to a source of A.C. potential, said terminal means being connected across said parallel branch circuits for applying the A.C. operating potential thereto, unidirectional conductive means connected in said branch circuits and phased to pass current through the load windings only during the same predetermined alternate half-cycles of said A.C. potential, flux-level setting means on each of said cores, asymmetrical conducting means connected in series with each of said flux setting means, said asymmetrical conducting means being connected to simultaneously pass half-wave currents from the A.C. potential only on the other alternate half-cycles thereof, and connections to a control signal source for applying a control signal to said asymmetrical means, said asymmetrical means being effective to present a conductive path to the control signal only while passing said half-wave currents whereby said flux setting means function to establish the reference and control flux levels in said cores in response respectively to said half-wave currents and the control signal.

10. The arrangement of claim 9, wherein said flux setting means include reset means on each of said cores and control means on each of said cores.

11. The arrangement of claim 10, wherein said reset means and said control means are defined by a common winding on each of said cores.

12. The arrangement of claim 10, wherein said reset means are defined by a portion of each of said load windings, and wherein said control means are formed by a pair of control windings each wound on a respective one of said cores and serially connected through said connections to the control signal source.

References Cited in the file of this patent

UNITED STATES PATENTS

| | | |
|---|---|---|
| 2,752,560 | Baker | June 26, 1956 |
| 2,754,473 | Hooper | July 10, 1956 |
| 2,904,744 | DeLalio | Sept. 15, 1959 |

FOREIGN PATENTS

| | | |
|---|---|---|
| 736,931 | Great Britain | Sept. 14, 1955 |

OTHER REFERENCES

A Half-Wave Auto-Transformer Magnetic Amplifier, NavOrd Report 2719, published January 9, 1953.

A Transient-Controlled Magnetic Amplifier, prepared by George Schohan, NavOrd Report 4258, published March 29, 1956, pp. 1, 2 and 11, by Naval Ordnance Laboratory, White Oak, Md.